No. 830,467.  
PATENTED SEPT. 4, 1906.  
M. VIVIAN.  
NON-SLIPPING TIRE.  
APPLICATION FILED JULY 27, 1903.
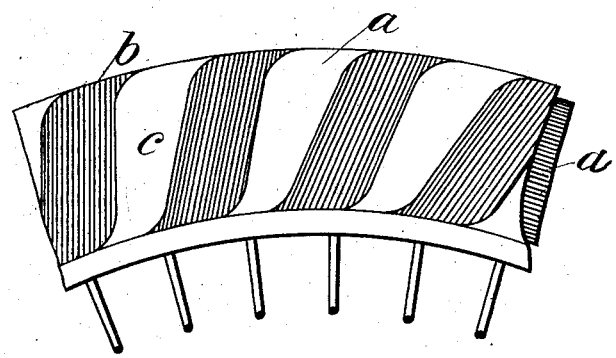
Witnesses:
Inventor  
MARK VIVIAN

UNITED STATES PATENT OFFICE.

MARK VIVIAN, OF CHISWICK, LONDON, ENGLAND.

NON-SLIPPING TIRE.

No. 830,467.  Specification of Letters Patent.  Patented Sept. 4, 1906.

Application filed July 27, 1903. Serial No. 167,193.

*To all whom it may concern:*

Be it known that I, MARK VIVIAN, a subject of the King of Great Britain, residing at Chiswick, in the county of Middlesex, London, England, have invented a new and useful Improvement in or Relating to Non-Slipping Tires, of which the following is a specification.

This invention relates to improvements in or relating to non-slipping tires, and has for its main object to construct a tire or the tread thereof of different degrees of hardness or vulcanization in order to obviate the tendency to side slip or skid.

In order that my invention may be readily understood, reference is hereby made to the accompanying sheet of illustrative drawing, wherein the figure is a side elevational view of a portion of a tire formed in accordance with my invention.

In carrying my invention into practice I form the tire $a$ of alternate sections $b$ $c$ of different degrees of hardness or flexibility, such sections running either obliquely or diagonally, as shown, or they may be arranged in a parallel or transverse or other convenient manner or pattern. The said tire may be formed of caoutchouc, india-rubber, gum-elastic, or any other similar elastic substance or material. In the case of pneumatic tires an inner air-tube $d$ may be employed, or the tire may be of the tubeless kind.

A convenient method of manufacturing the tire is by taking the rubber or its equivalent in a semifluid or viscous state and arranging same in alternate sections side by side, as aforesaid, certain of such sections being afterward hardened or vulcanized to the requisite degree and the other ones (preferably those occurring alternately) to a less or greater degree, as found desirable or convenient. After the evaporation of the solvent employed is completed the several sections will be joined together at their meeting edges, so as to form the tire in one piece. The tire or non-slipping band can also be produced by cementing together at their meeting edges alternate rubber or similar sections or strips of different degrees of hardness. Any suitable process of vulcanizing can be employed to harden the rubber or its equivalent to the various degrees required.

What I claim as my invention, and desire to secure by Letters Patent of the United States, is—

1. In a non-slipping tire or tread, the combination with sections or strips of hard rubber; of interposed strips or sections of softer rubber, such alternate sections being united chemically during manufacture at their meeting edges to form a continuous inseparable piece having a perfectly smooth or flush surface which contacts with the ground, substantially as specified.

2. As an article of manufacture a non-slipping tread for application to existing tires, said tread being composed of alternate sections of hard and soft rubber united at their meeting edges during the process of manufacture and in a non-mechanical manner, said tread having a perfectly flush or smooth surface and the said sections so arranged as to cause at least two of them to contact with the ground simultaneously, substantially as specified.

In testimony whereof I have hereunto set my hand in the presence of two subscribing witnesses.

MARK VIVIAN.

Witnesses:
 ALFD. A. THORNTON,
 H. A. WOODBRIDGE.